United States Patent
Leu et al.

(10) Patent No.: US 6,899,753 B2
(45) Date of Patent: May 31, 2005

(54) HIGHLY BLEED-ALLEVIATING INK COMPOSITION

(75) Inventors: Yi-Jing Leu, Hsinchu (TW); In-Shan Sir, Kaohsiung (TW); Chia-Hsin Chien, Taoyuan Hsien (TW); Yu-chang Shen, Taipei (TW); Yu-Ting Lin, Lu-chou (TW)

(73) Assignee: BenQ Corporation, Taoyuan (TW)

( * ) Notice: Subject to any disclaimer, the term of this patent is extended or adjusted under 35 U.S.C. 154(b) by 3 days.

(21) Appl. No.: 10/210,611

(22) Filed: Jul. 31, 2002

(65) Prior Publication Data

US 2003/0037700 A1 Feb. 27, 2003

(30) Foreign Application Priority Data

Aug. 2, 2001 (TW) ........................................ 90118900 A

(51) Int. Cl.$^7$ .............................. C09D 11/00; B41J 2/01
(52) U.S. Cl. ................................. 106/31.58; 106/31.86; 347/100
(58) Field of Search ........................... 106/31.58, 31.86; 347/100

(56) References Cited

U.S. PATENT DOCUMENTS

| | | | | |
|---|---|---|---|---|
| 4,631,085 A | | 12/1986 | Kawanishi et al. | 106/31.48 |
| 4,713,113 A | | 12/1987 | Shimada et al. | 106/31.5 |
| 4,737,190 A | * | 4/1988 | Shimada et al. | 106/31.48 |
| 4,935,488 A | * | 6/1990 | Omatsu et al. | 528/272 |
| 5,183,502 A | * | 2/1993 | Meichsner et al. | 106/31.58 |
| 5,254,158 A | * | 10/1993 | Breton et al. | 106/31.58 |
| 5,371,531 A | | 12/1994 | Rezanka et al. | 347/43 |
| 5,501,726 A | * | 3/1996 | Yui et al. | 106/31.58 |
| 5,707,433 A | * | 1/1998 | Kuge et al. | 106/31.86 |
| 5,746,818 A | * | 5/1998 | Yatake | 106/31.86 |
| 5,922,117 A | * | 7/1999 | Malhotra et al. | 106/31.58 |
| 6,174,357 B1 | * | 1/2001 | Kappele | 106/31.77 |
| 6,585,818 B2 | * | 7/2003 | Thakkar et al. | 106/31.6 |
| 2003/0195274 A1 | * | 10/2003 | Nakamura et al. | 523/160 |
| 2004/0021752 A1 | * | 2/2004 | Lauw et al. | 347/100 |
| 2004/0044098 A1 | * | 3/2004 | McJunkins et al. | 523/160 |

* cited by examiner

*Primary Examiner*—Helene Klemanski
(74) *Attorney, Agent, or Firm*—Ladas & Parry LLP

(57) ABSTRACT

A highly bleed-alleviating ink composition including at least one colorant, an aqueous media, a linear diol, and a humectant. The main feature of the ink composition is the addition of the linear diol. When the ink composition is applied in ink-jet printing, not only is the bleeding between black ink and color ink alleviated, but also water-fastness and printing quality are improved.

18 Claims, 6 Drawing Sheets

HIGHLY BLEED-ALLEVIATING INK COMPOSITION

BACKGROUND OF THE INVENTION

1. Field of the Invention

The present invention relates to an ink composition, and more particularly to a highly bleed-alleviating ink composition and its application in ink-jet printing.

2. Background of the Invention

Ink-jet printing technology has been developed for many years. The advantages include low price, low noise, and good full-color printing quality. Also, various substrates recording substrate including plain paper, paper for special printing, and transparency can be printed upon.

Ink-jet printing is a non-contact method that involves ejecting ink droplets onto a recording substrate. For color ink-jet printing, preferable ink must meet the following requirements:

(1) Ink printed on the recording substrate has no feathering or bleeding.
(2) Ink printed on the recording substrate dries very fast.
(3) After printing, the printing nozzles do not generate clogging.
(4) The ink used must have good storage stability.
(5) The ink used must be non-toxic for safety.

Bleeding is always a problem in ink-jet printing. When ink of one color is printed on paper, if the ink droplets can not effectively coagulate, they will, by means of capillarity action through the paper fibers, diffuse into another color. This phenomenon is called bleeding, and severely affects printing quality.

Several methods have been proposed to reduce bleeding. The first and most frequently-used method is to increase the distance between various droplets. This method also greatly decreases the resolution. The second method is to lengthen the time interval between every two ink droplets. In U.S. Pat. No. 5,371,531, two types of ink with different drying rate are used. The ink droplets of the first type are first ejected. The ink droplets of the second type are then ejected after the ink droplets of the first type have dried. However, the printing rate is limited. The third method is to add a zwitterionic or non-ionic surfactant to ink. When the surfactant is added in a concentration equal to or above its critical micelle concentration, bleeding can be alleviated.

Until now, the most effective method to alleviate bleeding of ink on the recording substrate has been developing in adding an effective amount of surfactant. By changing the physical property of the ink, such as surface tension or viscosity, to achieve bleed-alleviation of the ink droplets.

SUMMARY OF THE INVENTION

One object of the present invention is to provide a highly bleed-alleviating ink composition.

The second object of the present invention is to provide an ink-jet printing method that alleviates bleeding.

To achieve the above-mentioned objects, the ink composition of the present invention includes at least one colorant, an aqueous media, and a linear diol.

The ink-jet printing method for alleviating bleeding includes the following steps. First, ink is provided to an ink-jet printing device. The ink includes at least one colorant, an aqueous media, and a linear diol for alleviating bleeding of the ink. Next, the ink is ejected onto a recording substrate.

The feature of the present invention resides in the addition of a linear diol to the ink composition. In U.S. Pat. Nos. 4,631,085, 4,713,113, and 4,737,190, humectants have been added to the ink to prevent the ink at the nozzle of the ink cartridge from evaporation to generate precipitations and crystals, thus preventing plugging of the nozzle. The humectant used is usually a low-volatile and water-miscible organic compound. However, the addition of humectant easily causes a slow drying rate of the ink. Also, the ink has inferior water-fastness and bleeds easily.

In the prior art, diol has been used as a humectant in ink. However, the present invention discloses that the addition of linear diol has highly bleed-alleviating properties.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

DETAILED DESCRIPTION OF THE INVENTION

Figure 1:
FIG. 1 is a printed paper showing the black ink lines bleeding into the yellow ink background according to the ink composition of Example 1 of the present invention.

The ink composition of the present invention includes at least one colorant. Colorant suitable for use in the present invention can be a water soluble dye, such as Directive Blue 199 dye, Acidic Blue 9 dye, Acidic Yellow 23 dye, Acidic Yellow 17 dye, or Reactive Red 180 dye. The colorant can also be a pigment such as Pigment Yellow 74.

The main feature of the present invention resides in the addition of a linear diol to alleviate bleeding. The linear diol will not cause plugging of the nozzle, has high stability and bleed-alleviating properties. The linear diol can be added in an amount of 0.1 to 20 weight %, preferably 1 to 10 weight %. Linear diols suitable for use in the present invention includes all linear diols having a carbon number of 1 to 10. Representative examples include 1,1-ethandiol, 1,2-ethandiol, 1,1-propandiol, 1,2-propandiol, 1,3-propandiol, 2,2-propandiol, 1,1-butandiol, 1,2-butandiol, 1,3-butandiol, 1,4-butandiol, 2,3-butandiol, 2,2-butandiol, 1,1-pentandiol, 1,2-pentandiol, 1,3-pentandiol, 1,4-pentandiol, 1,5-pentandiol, 2,4-pentandiol, 2,3-pentandiol, 3,3-pentandiol, 2,2-pentandiol, 1,1-hexandiol, 1,2-hexandiol, 1,3-hexandiol, 1,4-hexandiol, 1,5-hexandiol, 1,6-hexandiol, 2,5-hexandiol, 2,4-hexandiol, 2,3-hexandiol, 2,2-hexandiol, 3,3-hexandiol, 1,1-heptandiol, 1,2-heptandiol, 1,3-heptandiol, 1,4-heptandiol, 1,5-heptandiol, 1,6-heptandiol, 1,7-heptandiol, 2,6-heptandiol, 2,5-heptandiol, 3,5-heptandiol, 2,4-heptandiol, 3,4-heptandiol, 3,3-heptandiol, 4,4-heptandiol, 1,1-octandiol, 1,2-octandiol, 1,3-octandiol, 1,4-octandiol, 1,5-octandiol, 1,6-octandiol, 1,7-octandiol, 1,8-octandiol, 2,7-octandiol, 2,3-octandiol, 2,6-octandiol, 3,6-octandiol, 3,3-octandiol, 4,5-octandiol, 4,4-octandiol, 1,1-nonandiol, 1,2-nonandiol, 1,3-nonandiol, 1,4-nonandiol, 1,5-nonandiol, 1,6-nonandiol, 1,7-nonandiol, 1,8-nonandiol, 1,9-nonandiol, 2,8-nonandiol, 2,7-nonandiol, 2,6-nonandiol, 2,5-nonandiol, 2,4-nonandiol, 2,3-nonandiol, 2,2-nonandiol, 3,7-nonandiol, 3,6-nonandiol, 3,5-nonandiol, 3,4-nonandiol, 3,3-nonandiol, 4,6-nonandiol, 4,5-nonandiol, 4,4-nonandiol, 5,5-nonandiol, 1,1-decanediol, 1,2-decanediol, 1,3-decanediol, 1,4-decanediol, 1,5-decanediol, 2,9-decanediol, 2,8-decanediol, 2,7-decanediol, 2,6-decanediol, 2,5-decanediol, 2,4-decanediol, 2,3-decanediol, 2,2-decanediol), 3,7-decanediol, 3,6-decanediol, 3,5-decanediol), 3,4-decanediol, 3,3-decanediol, 4,7-decanediol), 4,6-decanediol, 4,5-decanediol, 4,4-decanediol), 5,6-decanediol, and 5,5-decanediol. Preferable examples include 1,1-propandiol, 1,2-propandiol, 1,3-propandiol, 2,2-propandiol, 1,1-butandiol, 1,2-butandiol, 1,3-butandiol, 1,4-butandiol, 2,3-butandiol, 2,2-butandiol, 1,1-pentandiol, 1,2-pentandiol, 1,3-pentandiol, 1,4-pentandiol, 1,5-pentandiol, 2,4-pentandiol, 2,3-pentandiol, 3,3-pentandiol, 2,2-pentandiol, 1,1-hexandiol, 1,2-hexandiol, 1,3-hexandiol, 1,4-hexandiol, 1,5-hexandiol, 1,6-hexandiol, 2,5-hexandiol, 2,4-hexandiol, 2,3-hexandiol, 2,2-hexandiol, and 3,3-hexandiol.

The ink composition of the present invention includes an aqueous media. The aqueous media includes water and a humectant. The humectant is usually a low volatile liquid and has good miscibility with the main solution. The addition of the humectant can prevent the ink at the nozzle of the ink cartridge from evaporation, which can generate precipitation and crystals, thus preventing plugging of the nozzle. Typical humectants used in the ink-jet ink can be diethylene glycol or glycerol, added in an amount of 10.0 to 30.0 weight %.

The ink composition of the present invention can further include a surfactant. The main function of the surfactant is to decrease the surface tension of the ink. Further, the moisturizing effect can be increased, thus making ink-delivery and ink-ejection more smooth. The surfactant also functions as a dispersant. In practical uses, a dispersive dye will easily cause crystallization or coagulation of the colorant, thus clogging the nozzles at the ink cartridge. Therefore, the moisturizing effect of the dispersant must be enhanced to increase the dispersion of the additives.

Generally, an ink composition can include at lease one surfactant. The surfactant can be anionic, cationic, non-ionic, or zwitterionic and added in a total amount below 20.0 weight %. Representative examples of the suitable surfactants include A-102 available from CYTEC, LF-4 available from CYTEC, 1,3-BG available from KYOWA, OG available from KYOWA, BEPG available from KYOWA, PD-9 available from KYOWA, EP-810 available from AIR RPODUCT, 2-propanol, di-1,2-propylene glycol, 2-pyrrolidone, N-methyl-2-pyrrolidone, 2,4,7,9-tetramethyl-5-decyne-4,7-diol, 1,1,1-trimethylolpropane, CT-141 from AIR PRODUCT, CT-151 from AIR PRODUCT, OT-75 from CYTEC, GPG from CYTEC, OT-70PG from CYTEC, polyethandiol, polypropandiol, EO/PO copolymer, BO/EO copolymer, sodium dioctyl sulfonsuccinate, alkylene oxide adduct of acetylene glycol, polybutyl resin, cellulose derivative, styrene/acrylic copolymer resin, maleic acid/styrene copolymer, and polymers containing both hydrophilic and hydrophobic segments.

The ink composition of the present invention can further include a pH buffer solution. The colorant can create ideal colors only in a suitable pH range. The pH buffer solution suitable for use can be diethanolamine, triethanolamine, hydroxides of alkali metal such as lithium hydroxide, sodium hydroxide, and potassium hydroxide, ammonium hydroxide, and carbonates of alkali metals such as lithium carbonate, sodium carbonate, and potassium carbonates.

The ink composition of the present invention can further include a chelating agent. The addition of the chelating agent can prevent generation of crystalline salt. This prevents coagulation of particles and plugging of the nozzle of the ink cartridge. Chelating agents suitable for use include sodium ethylenediaminetetraacetate, trisodium nitrilotriacetate, hydroxyethyl ethylenediamine trisodium acetate, diethylenetriamino pentasodium acetate, and uramil disodium acetate.

In addition, the ink composition of the present invention can further include a UV-blocker to block the absorbance of the UV light and increase the light resistance of the colorant. A biocide or preservative can be added to inhibit the growth of microorganisms. A dispersant can be added to increase the dispersing ability of the additives in the ink.

The following examples are intended to illustrate the process and the advantages of the present invention more fully without limiting its scope, since numerous modifications and variations will be apparent to those skilled in the art.

EXAMPLE 1 (COMPARATIVE)

A yellow ink composition was prepared by mixing the following components.

4.0 wt % of Acidic Yellow 23 dye available from Clariant, Germany 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Janpan Chemical 3.0 wt % of surfactant OT-75 available from KYOWA 0.5 wt % of surfactant 465 available from Air Product 0.5 wt % of biocide SL-700 available from KYOWA deionized water The above yellow ink composition was printed onto a commercially available plain paper in a commercially available ink-jet printer. The printing covered the entire paper as a background.

The paper with yellow ink background was subjected to another ink-jet printing with black ink in the form of lines and was then observed for bleeding. The results are shown in FIG. 1 and Table 1.

The water-fastness was measured by the following method. The paper with yellow ink background (no black lines) was placed in deionized water for 30 minutes of washing, removed from washing, dried at room temperature, and then examined for ΔE for each color. The result is shown in Table 1.

EXAMPLE 2

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,2-ethandiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 2:
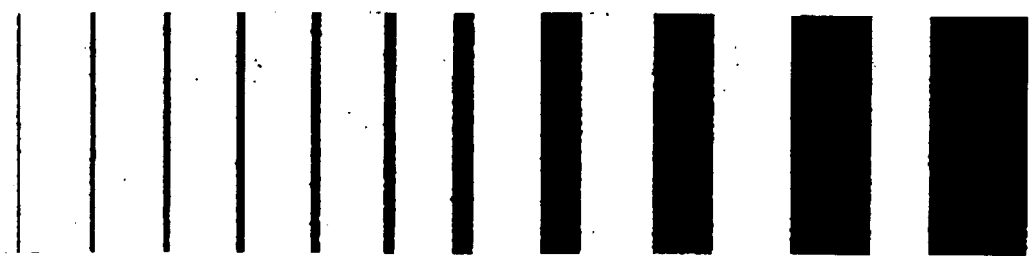
FIG. 2 is a printed paper showing that no bleeding is found according to the ink composition of Example 2 of the present invention with the addition of 1,2-ethandiol.

The printed paper with yellow ink background was subjected to another ink-jet printing with black ink in the form of lines and was then observed for bleeding. The results are shown in FIG. 2 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 3

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,3-propandiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 3:
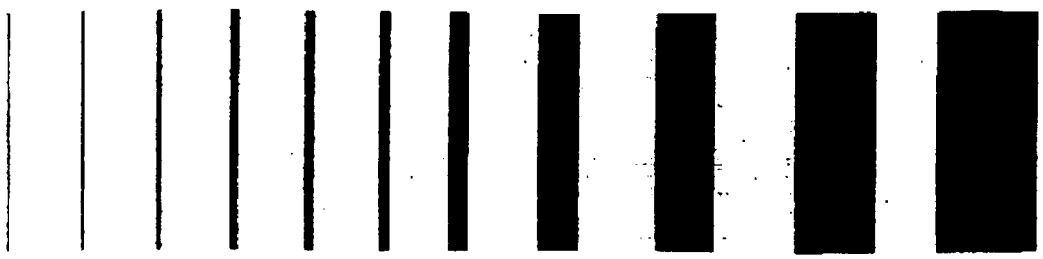
FIG. 3 is a printed paper showing that no bleeding is found according to the ink composition of Example 3 of the present invention with the addition of 1,3-propandiol.

The printed paper with yellow ink background was subjected to another ink-jet printing with black ink in the form of lines and was then observed for bleeding. The results are shown in FIG. 3 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 4

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,4-butandiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 4:
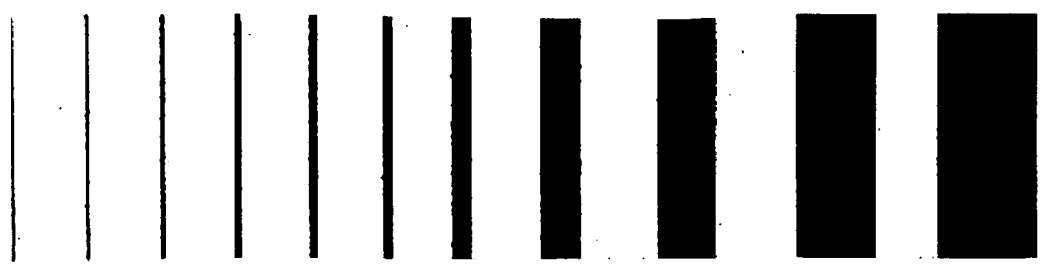
FIG. 4 is a printed paper showing that no bleeding is found according to the ink composition of Example 4 of the present invention with the addition of 1,4-butandiol.

The printed paper with yellow ink background was subjected to another ink-jet printing with black ink in the form of lines and was then observed for bleeding. The results are shown in FIG. 4 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 5

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan chemical 3.0 wt % of surfactant OT-75 available from KYOWA 0.5 wt % of surfactant 465 available from Air Product 2.5 wt % of 1,5-pentadiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 5:
FIG. 5 is a printed paper showing that no bleeding is found according to the ink composition of Example 5 of the present invention with the addition of 1,5-pentandiol.

The printed paper with yellow ink background was subjected to another ink-jet printing with black ink in the form of lines and was then observed for bleeding. The results are shown in FIG. 5 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 6

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,6-hexandiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 6:
FIG. 6 is a printed paper showing that no bleeding is found according to the ink composition of Example 6 of the present invention with the addition of 1,6-hexandiol.

The printed paper with yellow ink background was subjected to another ink-jet printing with black ink in the form of lines and was then observed for bleeding. The results are shown in FIG. 6 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 7

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemical 2.0 wt % of surfactant 13-S-7 available from Sino-Japan Chemical 3.0 wt % of surfactant OT-75 available from KYOWA 0.5 wt % of surfactant 465 available from Air Product 2.5 wt % of 1,7-heptandiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 7:
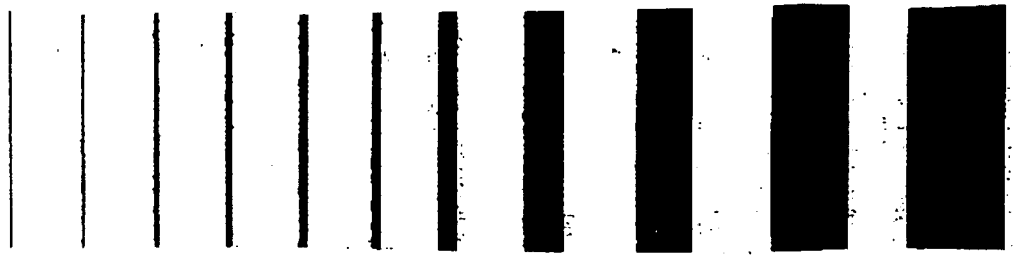
FIG. 7 is a printed paper showing that no bleeding is found according to the ink composition of Example 7 of the present invention with the addition of 1,7-heptandiol.

The printed paper with yellow ink background was subjected to another ink-jet printing with black ink in the form of lines and was then observed for bleeding. The results are shown in FIG. 7 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 8

A yellow ink composition was prepared by mixing the following components.

4.0 wt % of Acidic Yellow 23 dye available from Clariant 0.5 wt % of Directive Yellow 86 dye available from Clariant 4.0 wt % of PEG 700 (polyethylene glycol 700) available from U.C.C.

4.0 wt % of 2-pyrrolidone available from DOW 4.0 wt % of 2-ethyl-2-(hydromethyl)-1,3-propanediol (EHMPD) available from Lancaster 2.0 wt % of surfactant 13-S-5 available from Sino-Japan Chemcial 2.0 wt % of surfactant 13-S-7 available from Sino-Japan Chemcial 3.0 wt % of surfactant OT-75 available from KYOWA 0.5 wt % of surfactant 465 available from Air Product 2.5 wt % of 1,8-octandiol available from Lancaster 0.5 wt % of biocide SL-700 available from KYOWA deionized water The above yellow ink composition was printed onto a commercially available plain paper in a commercially available ink-jet printer. The printing covered the entire paper.

Figure 8:
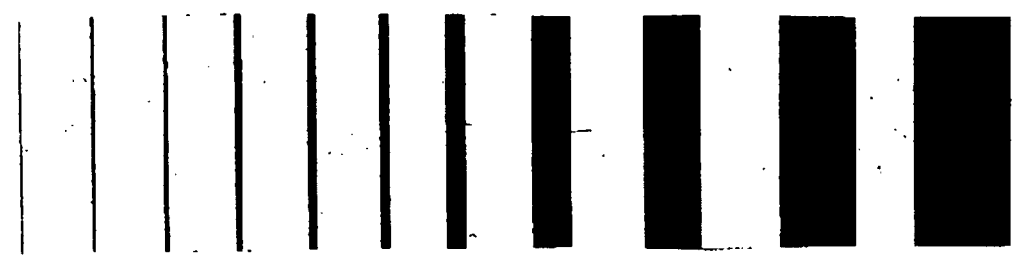
FIG. 8 is a printed paper showing that no bleeding is found according to the ink composition of Example 8 of the present invention with the addition of 1,8-octandiol.

The printed paper with yellow ink background was subjected to another ink-jet printing with black ink in the form of lines and was then observed for bleeding. The results are shown in FIG. 8 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 9

A yellow ink composition was prepared by mixing the following components.

- 4.0 wt % of Acidic Yellow 23 dye available from Clariant
- 0.5 wt % of Directive Yellow 86 dye available from Clariant
- 4.0 wt % of PEG 700 (polyethylene glycol 700) available from U.C.C.
- 4.0 wt % of 2-pyrrolidone available from DOW
- 4.0 wt % of 2-ethyl-2-(hydromethyl)-1,3-propanediol (EHMPD) available from Lancaster
- 2.0 wt % of surfactant 13-S-5 available from Sino-Japan Chemcial
- 2.0 wt % of surfactant 13-S-7 available from Sino-Japan Chemcial
- 3.0 wt % of surfactant OT-75 available from KYOWA
- 0.5 wt % of surfactant 465 available from Air Product
- 2.5 wt % of 1,9-nonandiol available from Lancaster
- 0.5 wt % of biocide SL-700 available from KYOWA
- deionized water The above yellow ink composition was printed onto a commercially available plain paper in a commercially available ink-jet printer. The printing covered the entire paper.

Figure 9:
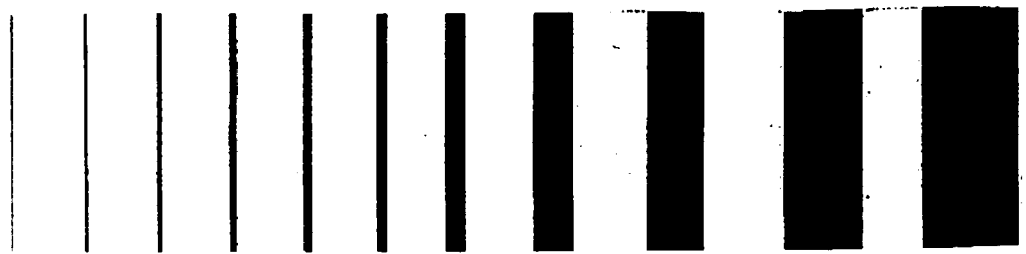
FIG. 9 is a printed paper showing that no bleeding is found according to the ink composition of Example 9 of the present invention with the addition of 1,9-nonandiol.

The printed paper with yellow ink background was subjected to another ink-jet printing with black ink in the form of lines and was then observed for bleeding. The results are shown in FIG. 9 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 10

A yellow ink composition was prepared by mixing the following components.

- 4.0 wt % of Acidic Yellow 23 dye available from Clariant
- 0.5 wt % of Directive Yellow 86 dye available from Clariant
- 4.0 wt % of PEG 700 (polyethylene glycol 700) available from U.C.C.
- 4.0 wt % of 2-pyrrolidone available from DOW
- 4.0 wt % of 2-ethyl-2-(hydromethyl)-1,3-propanediol (EHMPD) available from Lancaster
- 2.0 wt % of surfactant 13-S-5 available from Sino-Japan Chemcial
- 2.0 wt % of surfactant 13-S-7 available from Sino-Japan Chemcial
- 3.0 wt % of surfactant OT-75 available from KYOWA
- 0.5 wt % of surfactant 465 available from Air Product
- 2.5 wt % of 1,2-propandiol available from Lancaster
- 0.5 wt % of biocide SL-700 available from KYOWA
- deionized water.

The above yellow ink composition was printed onto a commercially available plain paper in a commercially available ink-jet printer. The printing covered the entire paper.

Figure 10:
FIG. 10 is a printed paper showing that no bleeding is found according to the ink composition of Example 10 of the present invention with the addition of 1,2-propandiol.

The printed paper with yellow ink background was subjected to another ink-jet printing with black ink in the form of lines and was then observed for bleeding. The results are shown in FIG. 10 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 11

A yellow ink composition was prepared by mixing the following components.

- 4.0 wt % of Acidic Yellow 23 dye available from Clariant
- 0.5 wt % of Directive Yellow 86 dye available from Clariant
- 4.0 wt % of PEG 700 (polyethylene glycol 700) available from U.C.C.
- 4.0 wt % of 2-pyrrolidone available from DOW
- 4.0 wt % of 2-ethyl-2-(hydromethyl)-1,3-propanediol (EHMPD) available from Lancaster
- 2.0 wt % of surfactant 13-S-5 available from Sino-Japan Chemcial
- 2.0 wt % of surfactant 13-S-7 available from Sino-Japan Chemcial
- 3.0 wt % of surfactant OT-75 available from KYOWA
- 0.5 wt % of surfactant 465 available from Air Product
- 2.5 wt % of 1,2-butandiol available from Lancaster
- 0.5 wt % of biocide SL-700 available from KYOWA
- deionized water.

The above yellow ink composition was printed onto a commercially available plain paper in a commercially available ink-jet printer. The printing covered the entire paper.

Figure 11:
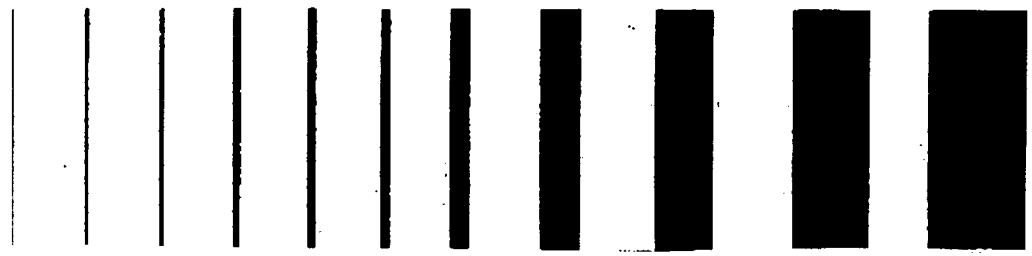
FIG. 11 is a printed paper showing that no bleeding is found according to the ink composition of Example 11 of the present invention with the addition of 1,2-butandiol.

The printed paper with yellow ink background was subjected to another ink-jet printing with black ink in the form of lines and was then observed for bleeding. The results are shown in FIG. 11 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

EXAMPLE 12

A yellow ink composition was prepared by mixing the following components.

- 8.0 wt % of Pigment Yellow 74 available from Bayer,
- 7.0 wt % of PEG 700 (polyethylene glycol 700) available from U.C.C.
- 4.0 wt % of 2-pyrrolidone available from DOW
- 4.0 wt % of 2-ethyl-2-(hydromethyl)-1,3-propanediol (EHMPD) available from Lancaster
- 3.0 wt % of surfactant OT-75 available from KYOWA
- 0.5 wt % of surfactant 465 available from Air Product
- 2.5 wt % of 1,4-butandiol available from Lancaster
- 0.5 wt % of biocide SL-700 available from KYOWA
- deionized water The above yellow ink composition was printed onto a commercially available plain paper in a commercially available ink-jet printer. The printing covered the entire paper.

Figure 12:
FIG. 12 is a printed paper showing that no bleeding is found according to the ink composition of Example 12 of the present invention with the addition of 1,4-butandiol.

The printed paper with yellow ink background was subjected to another ink-jet printing with black ink in the form of lines and was then observed for bleeding. The results are shown in FIG. 12 and Table 1.

The water-fastness was measured by the following method. The printed paper with yellow ink background (no black lines) was placed in deionized water for 30 minutes of washing, removed from washing, dried at room temperature, and then examined for ΔE for each color. The result is shown in Table 1.

TABLE 1

| Example | Diol | Bleed Alleviation | Water-fastness |
|---|---|---|---|
| 1 | None | X | X |
| 2 | 1,2-ethandiol | ○ | ○ |
| 3 | 1,3-propandiol | ○ | ○ |
| 4 | 1,4-butandiol | ○ | ○ |
| 5 | 1,5-pentandiol | ○ | Δ |
| 6 | 1,6-hexandiol | ○ | ○ |
| 7 | 1,7-heptandiol | ○ | ○ |
| 8 | 1,8-octandiol | ○ | ○ |
| 9 | 1,9-nonandiol | ○ | Δ |
| 10 | 1,2-propandiol | ○ | ○ |
| 11 | 1,2-butandiol | ○ | ○ |
| 12 | 1,4-butandiol | ○ | ○ |

Note: ○ indicates excellent, Δ fair, and X inferior.

The present invention provides an ink composition including at least one colorant, an aqueous media, a humectant, a surfactant, and most specially a linear diol having from 1 to 10 carbon atoms. The special ink composition will not cause plugging of ink nozzles, has high stability, and has highly bleed-alleviating properties.

When the ink composition is applied in ink-jet printing, not only is bleeding between black ink and color ink alleviated, but also the water-fastness and printing quality are improved.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An ink composition, comprising:
   a dye, comprising acidic yellow 23 and directive yellow 86;
   an aqueous media;
   a linear diol; and
   a humectant,
   wherein 1,1-ethandiol, 1,2-ethandiol, 1,1-propandiol, 1,2-propandiol, 1,3-propandiol, 2,2-propandiol, 1,1-butandiol, 1,2-butandiol, 1,3-butandiol, 1,4-butandiol, 2,3-butandiol, 2,2-butandiol, 1,1-pentandiol, 1,2-pentandiol, 1,3-pentandiol, 1,4-pentandiol, 1,5-pentandiol, 2,4-pentandiol, 2,3-pentandiol, 3,3-pentandiol, 2,2-pentandiol, 1,1-hexandiol, 1,2-hexandiol, 1,3-hexandiol, 1,4-hexandiol, 1,5-hexandiol, 1,6-hexandiol, 2,5-hexandiol, 2,4-hexandiol, 2,3-hexandiol, 2,2-hexandiol, 3,3-hexandiol, 1,1-heptandiol, 1,2-heptandiol, 1,3-heptandiol, 1,4-heptandiol, 1,5-heptandiol, 1,6-heptandiol, 1,7-heptandiol, 2,6-heptandiol, 2,5-heptandiol, 3,5-heptandiol, 2,4-heptandiol, 3,4-heptandiol, 3,3-heptandiol, 4,4-heptandiol, 1,1-octandiol, 1,2-octandiol, 1,3-octandiol, 1,4-octandiol, 1,5-octandiol, 1,6-octandiol, 1,7-octandiol, 1,8-octandiol, 2,7-octandiol, 2,3-octandiol, 2,6-octandiol, 3,6-octandiol, 3,3-octandiol, 4,5-octandiol, 4,4-octandiol, 1,1-nonandiol, 1,2-nonandiol, 1,3-nonandiol, 1,4-nonandiol, 1,5-nonandiol, 1,6-nonandiol, 1,7-nonandiol, 1,8-nonandiol, 1,9-nonandiol, 2,8-nonandiol, 2,7-nonandiol, 2,6-nonandiol, 2,5-nonandiol, 2,4-nonandiol, 2,3-nonandiol, 2,2-nonandiol, 3,7-nonandiol, 3,6-nonandiol, 3,5-nonandiol, 3,4-nonandiol, 3,3-nonandiol, 4,6-nonandiol, 4,5-nonandiol, 4,4-nonandiol, 5,5-nonandiol, 1,1-decanediol, 1,2-decanediol, 1,3-decanediol, 1,4-decanediol, 1,5-decanediol, 2,9-decanediol, 2,8-decanediol, 2,7-decanediol, 2,6-decanediol, 2,5-decanediol, 2,4-decanediol, 2,3-decanediol, 2,2-decanediol, 3,7-decanediol, 3,6-decanediol, 3,5-decanediol, 3,4-decanediol, 3,3-decanediol, 4,7-decanediol, 4,6-decanediol, 4,5-decanediol, 4,4-decanediol, 5,6-decanediol, or 5,5-decanediol.

2. The ink composition as claimed in claim 1, wherein the linear diol is present in an amount of 0.1 to 20 weight%.

3. The ink composition as claimed in claim 1, further comprising a surfactant.

4. The ink composition as claimed in claim 1, further comprising a pH buffer solution.

5. The ink composition as claimed in claim 1, further comprising a chelating agent.

6. The ink composition as claimed in claim 1, further comprising a biocide.

7. An ink-jet printing method for alleviating bleeding, comprising:
   providing a first ink to an ink-jet printing device, wherein the first ink includes a first dye; an aqueous media; and a linear diol for alleviating bleeding of the ink;
   ejecting the first ink onto a recording substrate; and
   ejecting a second ink comprising a second dye onto the recording substrate printed with the first ink.

8. The method as claimed in claim 7, wherein the linear diol is present in an amount of 0.1 to 20 weight%.

9. The method as claimed in claim 7, wherein the ink further comprises a humectant.

10. The method as claimed in claim 7, wherein the ink further comprises surfactant.

11. The method as claimed in claim 7, wherein the ink further comprises a pH buffer solution.

12. The method as claimed in claim 7, wherein the ink further comprises a chelating agent.

13. The method as claimed in claim 7, wherein the ink further comprises a biocide.

14. The method as claimed in claim 7, wherein the linear diol is 1,1-ethandiol, 1,2-ethandiol, 1,1-propandiol, 1,2-propandiol, 1,3-propandiol, 2,2-propandiol, 1,1-butandiol, 1,2-butandiol, 1,3-butandiol, 1,4-butandiol, 2,3-butandiol, 2,2-butandiol, 1,1-pentandiol, 1,2-pentandiol, 1,3-pentandiol, 1,4-pentandiol, 1,5-pentandiol, 2,4-pentandiol, 2,3-pentandiol, 3,3-pentandiol, 2,2-pentandiol, 1,1-hexandiol, 1,2-hexandiol, 1,3-hexandiol, 1,4-hexandiol, 1,5-hexandiol, 1,6-hexandiol, 2,5-hexandiol, 2,4-hexandiol, 2,3-hexandiol, 2,2-hexandiol, 3,3-hexandiol, 1,1-heptandiol, 1,2-heptandiol, 1,3-heptandiol, 1,4-heptandiol, 1,5-heptandiol, 1,6-heptandiol, 1,7-heptandiol, 2,6-heptandiol, 2,5-heptandiol, 3,5-heptandiol, 2,4-heptandiol, 3,4-heptandiol, 3,3-heptandiol, 4,4-heptandiol, 1,1-octandiol, 1,2-octandiol, 1,3-octandiol, 1,4-octandiol, 1,5-octandiol, 1,6-octandiol, 1,7-octandiol, 1,8-octandiol, 2,7-octandiol, 2,3-octandiol, 2,6-octandiol, 3,6-octandiol, 3,3-octandiol, 4,5-octandiol, 4,4-octandiol, 1,1-nonandiol, 1,2-nonandiol, 1,3-nonandiol, 1,4-nonandiol, 1,5-nonandiol, 1,6-nonandiol, 1,7-nonandiol, 1,8-nonandiol, 1,9-nonandiol, 2,8-nonandiol, 2,7-nonandiol, 2,6-nonandiol, 2,5-nonandiol, 2,4-nonandiol, 2,3-nonandiol, 2,2-nonandiol, 3,7-nonandiol, 3,6-nonandiol, 3,5-nonandiol, 3,4-nonandiol, 3,3-nonandiol, 4,6-nonandiol, 4,5-nonandiol, 4,4-nonandiol, 5,5-nonandiol, 1,1-decanediol, 1,2-decanediol, 1,3-decanediol, 1,4-decanediol, 1,5-decanediol, 2,9-decanediol, 2,8-decanediol, 2,7-decanediol, 2,6-decanediol, 2,5-decanediol, 2,4-decanediol, 2,3-decanediol, 2,2-decanediol, 3,7-decanediol, 3,6-decanediol, 3,5-decanediol, 3,4-decanediol, 3,3-decanediol, 4,7-decanediol, 4,6-decanediol, 4,5-decanediol, 4,4-decanediol, 5,6-decanediol, or 5,5-decanediol.

15. The method as claimed in claim 7, wherein the first ink is yellow.

16. The method as claimed in claim 15, wherein the second ink is black.

17. An ink-jet printing method for alleviating bleeding, comprising:
providing a first ink to an ink-jet printing device, wherein the first ink includes a first dye; an aqueous media; and a linear diol for alleviating bleeding of the ink;
ejecting the first ink onto recording substrate; and
ejecting a second ink comprising a second dye onto the recording substrate printed with the first ink, wherein the linear diol is 1,1-ethandiol, 1,2-ethandiol, 1,1-propandiol, 1,2-propandiol, 1,3-propandiol, 2,2-propandiol, 1,1-butandiol, 1,2-butandiol, 1,3-butandiol, 1,4-butandiol, 2,3-butandiol, 2,2-butandiol, 1,1-pentandiol, 1,2-pentandiol, 1,3-pentandiol, 1,4-pentandiol, 1,5-pentandiol, 2,4-pentandiol, 2,3-pentandiol, 3,3-pentandiol, 2,2-pentandiol, 1,1-hexandiol, 1,2-hexandiol, 1,3-hexandiol, 1,4-hexandiol, 1,5-hexandiol, 1,6-hexandiol, 2,5-hexandiol, 2,4-hexandiol, 2,3-hexandiol, 2,2-hexandiol, 3,3-hexandiol, 1,1-heptandiol, 1,2-heptandiol, 1,3-heptandiol, 1,4-heptandiol, 1,5-heptandiol, 1,6-heptandiol, 1,7-heptandiol, 2,6-heptandiol, 2,5-heptandiol, 3,5-heptandiol, 2,4-heptandiol, 3,4-heptandiol, 3,3-heptandiol, 4,4-heptandiol, 1,1-octandiol, 1,2-octandiol, 1,3-octandiol, 1,4-octandiol, 1,5-octandiol, 1,6-octandiol, 1,7-octandiol, 1,8-octandiol, 2,7-octandiol, 2,3-octandiol, 2,6-octandiol, 3,6-octandiol, 3,3-octandiol, 4,5-octandiol, 4,4-octandiol, 1,1-nonandiol, 1,2-nonandiol, 1,3-nonandiol, 1,4-nonandiol, 1,5-nonandiol, 1,6-nonandiol, 1,7-nonandiol, 1,8-nonandiol, 1,9-nonandiol, 2,8-nonandiol, 2,7-nonandiol, 2,6-nonandiol, 2,5-nonandiol, 2,4-nonandiol, 2,3-nonandiol, 2,2-nonandiol, 3,7-nonandiol, 3,6-nonandiol, 3,5-nonandiol, 3,4-nonandiol, 3,3-nonandiol, 4,6-nonandiol, 4,5-nonandiol, 4,4-nonandiol, 5,5-nonandiol, 1,1-decanediol, 1,2-decanediol, 1,3-decanediol, 1,4-decanediol, 1,5-decanediol, 2,9-decanediol, 2,6-decanediol, 2,7-decanediol, 2,6-decanediol, 2,5-decanediol, 2,4-decanediol, 2,3-decanediol, 2,2-decanediol, 3,7-decanediol, 3,6-decanediol, 3,5-decanediol, 3,4-decanediol, 3,3-decanediol, 4,7-decanediol, 4,6-decanediol, 4,5-decanediol, 4,4-decanediol, 5,6-decanediol, or 5,5-decanediol.

18. The ink composition as claimed in claim 1, wherein the linear diol is present in an amount of 2.5 weight%.

* * * * *

UNITED STATES PATENT AND TRADEMARK OFFICE
CERTIFICATE OF CORRECTION

PATENT NO. : 6,899,753 B2
DATED : May 31, 2005
INVENTOR(S) : Yi-Jing Leu et al.

It is certified that error appears in the above-identified patent and that said Letters Patent is hereby corrected as shown below:

Column 11,
Line 59, change "wherein" to -- wherein the linear diol is --.

Signed and Sealed this

Thirtieth Day of August, 2005

JON W. DUDAS
*Director of the United States Patent and Trademark Office*